(12) United States Patent
Nakao et al.

(10) Patent No.: US 12,048,898 B2
(45) Date of Patent: Jul. 30, 2024

(54) HOLLOW FIBER MEMBRANE AND METHOD FOR PRODUCING HOLLOW FIBER MEMBRANE

(71) Applicant: TOYOBO CO., LTD., Osaka (JP)

(72) Inventors: Takahito Nakao, Osaka (JP); Yasuki Terashima, Otsu (JP); Masanao Kohashi, Iwakuni (JP); Miharu Numoto, Otsu (JP)

(73) Assignee: TOYOBO MC CORPORATION, Osaka (JP)

( * ) Notice: Subject to any disclaimer, the term of this patent is extended or adjusted under 35 U.S.C. 154(b) by 415 days.

(21) Appl. No.: 17/434,215

(22) PCT Filed: Feb. 21, 2020

(86) PCT No.: PCT/JP2020/007077
§ 371 (c)(1),
(2) Date: Aug. 26, 2021

(87) PCT Pub. No.: WO2020/175374
PCT Pub. Date: Sep. 3, 2020

(65) Prior Publication Data
US 2022/0134289 A1 May 5, 2022

(30) Foreign Application Priority Data
Feb. 28, 2019 (JP) ................. 2019-036116

(51) Int. Cl.
*B01D 69/08* (2006.01)
*B01D 67/00* (2006.01)
(Continued)

(52) U.S. Cl.
CPC ..... *B01D 69/0871* (2022.08); *B01D 67/0083* (2013.01); *B01D 67/0088* (2013.01);
(Continued)

(58) Field of Classification Search
CPC ........ B01D 67/00; B01D 69/02; B01D 69/08; B01D 71/16
See application file for complete search history.

(56) References Cited

U.S. PATENT DOCUMENTS 10,369,530 B2 * 8/2019 Shimizu ............ B01D 67/0083
2006/0151375 A1 7/2006 Marui et al.
(Continued)

FOREIGN PATENT DOCUMENTS

CN 104785120 A 7/2015
CN 105246693 A 1/2016
(Continued)

OTHER PUBLICATIONS

Extended (Supplementary) European Search Report dated Oct. 27, 2022, issued in counterpart EP Application No. 20763535.0. (13 pages).
Office Action dated Jun. 23, 2021, issued in counterpart CN Application No. 202080005015.0, with machine translation. (14 pages).
(Continued)

*Primary Examiner* — Sharon Pregler
(74) *Attorney, Agent, or Firm* — WHDA, LLP

(57) ABSTRACT

A hollow fiber membrane that is a hollow fiber type semipermeable membrane, wherein a Raman value is 70% or more, and the Raman value is a ratio of a minimum value to a maximum value of peak intensities, which are intensities of maximum peaks in each of multiple Raman spectra obtained by Raman spectroscopy at multiple points in a membrane thickness direction of a transverse cross-section of the hollow fiber membrane in a state of being swollen with water.

7 Claims, 6 Drawing Sheets

(51) Int. Cl.
 B01D 69/02 (2006.01)
 B01D 71/16 (2006.01)
(52) U.S. Cl.
 CPC .......... B01D 69/02 (2013.01); B01D 69/081 (2013.01); B01D 69/082 (2013.01); B01D 71/16 (2013.01); *B01D 2323/08* (2013.01); *B01D 2323/12* (2013.01); *B01D 2323/283* (2013.01); *B01D 2325/04* (2013.01)

(56) References Cited

U.S. PATENT DOCUMENTS

| | | |
|---|---|---|
| 2009/0220612 A1 | 9/2009 | Perera |
| 2013/0140236 A1 | 6/2013 | Tokimi et al. |
| 2015/0008185 A1 | 1/2015 | Shimizu et al. |
| 2015/0136692 A1 | 5/2015 | Higashi et al. |
| 2015/0265976 A1 | 9/2015 | Shimizu et al. |
| 2016/0118639 A1 | 4/2016 | Ishihara |
| 2017/0263966 A1 | 9/2017 | Lozada et al. |
| 2017/0296985 A1 | 10/2017 | Nakao et al. |
| 2018/0028979 A1 | 2/2018 | Oh et al. |

FOREIGN PATENT DOCUMENTS

| | | |
|---|---|---|
| CN | 107003275 A | 8/2017 |
| CN | 107096396 A | 8/2017 |
| EP | 0 747 112 B1 | 1/2002 |
| JP | H03-120 A | 1/1991 |
| JP | 2013-198893 A | 10/2013 |
| JP | 2018-505053 A | 2/2018 |
| WO | 2012/026373 A1 | 3/2012 |
| WO | 2013/118859 A1 | 8/2013 |
| WO | 2013/125681 A1 | 8/2013 |
| WO | 2016/056547 A1 | 4/2016 |
| WO | 2017/122673 A1 | 7/2017 |

OTHER PUBLICATIONS

Notification dated Aug. 3, 2021, issued in counterpart JP Application No. 2021-502194, with English translation. (2 pages).
Information Offer Form and Description of Grounds of Rejection dated Jul. 27, 2021, issued in counterpart JP Application No. 2021-502194, with English translation. (14 pages).
MISUMI Corporation, "Water Absorption Ratio of Resin", [online], [searched Jul. 26, 2021], Internet <https://jp.misumi-ec.com/tech-info/categories/plastic_mold_design/pl09/c0981.html> (Well-Known Art), cited in Information Offer Form and Description of Grounds of Rejection dated Jul. 27, 2021, issued in counterpart JP Application No. 2021-502194. (3 pages).
Ase, T., et al., "Design of Hollow Fiber Ultrafiltration Membrane Made of Cellulose Acetate, and Optimization of Operating Conditions", Technical Information Institute Co., Ltd., Aug. 2014 (Well-Known Art), cited in Information Offer Form and Description of Grounds of Rejection dated Jul. 27, 2021, issued in counterpart JP Application No. 2021-502194. (8 pages).
Daicen Membrane-Systems Ltd., "Selecting method of the separation membrane", [searched Jul. 26, 2021], Internet<https://daicen.com/products/membrane/> (Well-Known Art), cited in Information Offer Form and Description of Grounds of Rejection dated Jul. 27, 2021, issued in counterpart JP Application No. 2021-502194. (2 pages).
Imagawa, A., "Ultrafiltration Membrane Mainly Hollow Fiber Type Ultrafiltration System", Journal of Textile Engineering, vol. 43, No. 9, 1990 (Well-Known Art), cited in Information Offer Form and Description of Grounds of Rejection dated Jul. 27, 2021, issued in counterpart JP Application No. 2021-502194. (7 pages).
G.R. Guillen et al.; Preparation and Characterization of Membranes Formed by Nonsolvent Induced Phase Separation: A Review, Industrial & Engineering Chemistry Research, 2011, 50, p. 3798-3817. (20 pages) cited in KR Office Action dated Apr. 14, 2023.
Office Action dated Apr. 14, 2023, issued in counterpart KR Application No. 10-2021-7030146, with English translation. (13 pages).

* cited by examiner

HOLLOW FIBER MEMBRANE AND METHOD FOR PRODUCING HOLLOW FIBER MEMBRANE

TECHNICAL FIELD

The present invention relates to a hollow fiber membrane and a method for producing a hollow fiber membrane.

BACKGROUND ART

PTLs 1 to 5 disclose a method for producing a hollow fiber membrane comprising: discharging a membrane-forming solution from a nozzle into a coagulation liquid via an air gap to coagulate the membrane-forming solution and sequentially pulling out a coagulation product from the coagulation liquid to obtain a hollow fiber membrane (spinning process); and washing the hollow fiber membrane obtained in the spinning process with water, and then subjecting the hollow fiber membrane to at least one of a hot water treatment and a salt water treatment (post-treatment process).

CITATION LIST

Patent Literature

PTL 1: WO 2012/026373
PTL 2: WO 2013/118859
PTL 3: WO 2013/125681
PTL 4: Japanese Patent Laying-Open No. 2013-198893
PTL 5: WO 2017/122673

SUMMARY OF INVENTION

Technical Problem

When a hollow fiber membrane is used, for example, in a membrane separation process in which the hollow fiber membrane is exposed to higher pressure than in a forward osmosis (FO) method, such as a reverse osmosis (RO) method, a problem is that a permeate flow rate of the hollow fiber membrane decreases over time. The decrease in the permeate flow rate of the hollow fiber membrane over time results in an increase in operational energy required for the membrane separation process using the hollow fiber membrane over time.

Accordingly, an object of the present invention is to suppress the decrease in the permeate flow rate of the hollow fiber membrane over time.

Solution to Problem (1) A hollow fiber membrane that is a hollow fiber type semipermeable membrane, wherein
 a Raman value is 70% or more, and
 the Raman value is a ratio of a minimum value to a maximum value of peak intensities, which are intensities of maximum peaks in each of multiple Raman spectra obtained by Raman spectroscopy at multiple points in a membrane thickness direction of a transverse cross-section of the hollow fiber membrane in a state of being swollen with water.
(2) The hollow fiber membrane according to (1), wherein the Raman value is 70% or more and 95% or less.

(3) The hollow fiber membrane according to (1) or (2), comprising a material that contains at least any of a cellulose-based polymer, a polysulfone-based polymer, and a polyamide-based polymer.
(4) The hollow fiber membrane according to any one of (1) to (3), wherein an inner diameter of the hollow fiber membrane is 40 μm or more and 200 μm or less.
(5) The hollow fiber membrane according to any one of (1) to (4), wherein a cross-sectional inner shape of the hollow fiber membrane is a triangular shape.
(6) A method for producing a hollow fiber membrane, comprising:
 spinning in which a membrane-forming solution is extruded from a nozzle into a coagulation liquid via an air gap and a coagulation product of the membrane-forming solution is pulled out from the coagulation liquid to obtain a hollow fiber membrane that is a hollow fiber type semipermeable membrane; and
 post-treatment process in which the hollow fiber membrane obtained in the spinning process was washed with water, and then subjected to at least a hot water treatment and a salt water treatment,
 wherein
 the membrane-forming solution comprises a solvent and a non-solvent, and a mass ratio of solvent/non-solvent in the membrane-forming solution is 40/60 to 70/30,
 the coagulation liquid comprises a solvent and a non-solvent other than water, and the total content of the solvent and the non-solvent other than water in the coagulation liquid is 30 to 70% by mass,
 the temperature of the coagulation liquid is 10 to 20° C., and
 the temperature of the salt water treatment is 70° C. or more and 95° C. or less.
(7) A hollow fiber membrane that is produced by the production method according to (6).

Advantageous Effects of Invention

According to the present invention, when the hollow fiber membrane is used for membrane separation by the BC method, it is possible to suppress a decrease in the permeate flow rate of the hollow fiber membrane over time.

DESCRIPTION OF EMBODIMENTS

Figure 1:
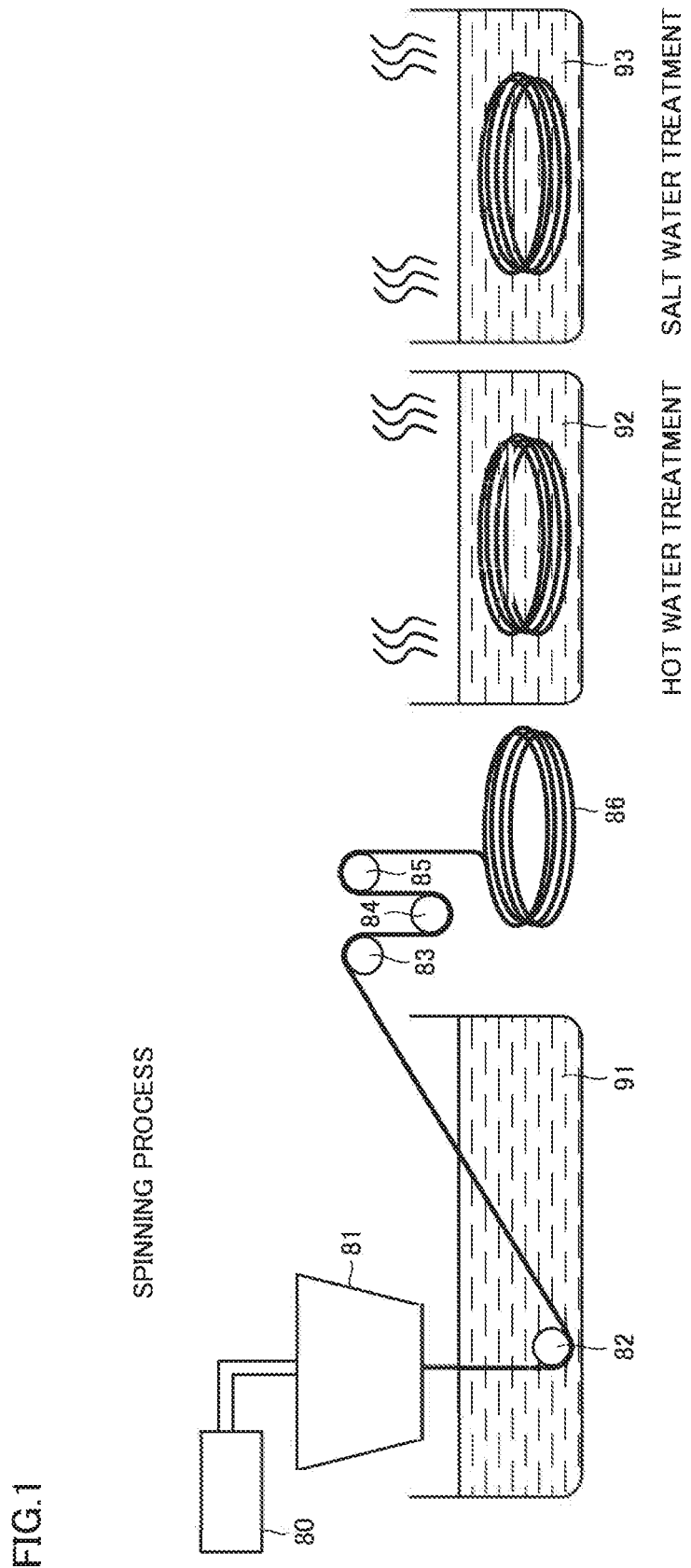
FIG. 1 is a schematic diagram for describing an example of a method for producing a hollow fiber membrane.

The embodiment of the present invention will be described with reference to the drawings. In the drawings, the same reference signs represent the same parts or corresponding parts. In addition, dimensional relationships such as length, width, thickness, and depth are appropriately changed for clarity and simplification of the drawings, and do not represent actual dimensional relationships.

<Hollow Fiber Membrane>

The hollow fiber membrane of the present embodiment is a hollow fiber type semipermeable membrane.

An inner diameter of the hollow fiber membrane is preferably 40 μm or more and 200 μm or less, and more preferably 40 μm or more and 180 μm or less.

A thickness of the hollow fiber membrane (the whole membrane) is preferably 20 to 200 μm and more preferably 30 to 150 μm. The membrane thickness can be calculated by (outer diameter−inner diameter)/2. A hollow rate of the hollow fiber membrane is preferably 10 to 50% and more preferably 12 to 40%. The hollow rate is a proportion of an area of a hollow part in a transverse cross-section of the hollow fiber membrane, and is represented by "hollow part cross-sectional area/(membrane part cross-sectional area+ hollow part cross-sectional area)×100(%)."

The average pore size of the hollow fiber membrane (average pore size of micropores of the whole membrane) is preferably 2 nm or less. Examples of a method for measuring the average pore size include a differential scanning calorimetry (DSC) method.

(Raman Value)

In the present invention, a Raman value of the hollow fiber membrane refers to a ratio of a minimum value to a maximum value of peak intensity for peak intensities of maximum peaks in each of multiple Raman spectra obtained by Raman spectroscopy at multiple points in the membrane thickness direction of a transverse cross-section of the hollow fiber membrane in a state of being swollen with water. The Raman value is a value that is an index of a density distribution in the membrane thickness direction of the hollow fiber membrane. The higher the Raman value, the higher the uniformity of the density distribution in the membrane thickness direction.

The Raman value of the hollow fiber membrane of the present embodiment is 70% or more. When the Raman value is within this range, it is possible to obtain an effect of suppressing a decrease in a permeate flow rate of the hollow fiber membrane over time. It is considered that this is because when the Raman value is less than 70%, structural symmetricity in the membrane thickness direction of the hollow fiber membrane deteriorates and the membrane structure becomes soft so that the structural change is large due to compaction from the initial state. Further, when the Raman value is less than 70%, hindrance (an event in which the hollow fiber membrane may be stretched or cut) is caused in producing a hollow fiber membrane element (hollow fiber membrane module) by using the hollow fiber membrane in the subsequent process, and occasionally a yield rate of the product standard may be greatly reduced.

The Raman value is preferably 70% or more and 95% or less. This is because a hollow fiber membrane having a Raman value of more than 95% may be difficult to produce, resulting in poor productivity (spinnability). The Raman value is more preferably 72% or more and 94% or less. When the Raman value is within such a range, the effect of suppressing the decrease in the permeate flow rate of the hollow fiber membrane over time can be more reliably obtained, and the effect of suppressing the decrease in the permeate flow rate over time is expected for a longer period of time.

Figure 3:
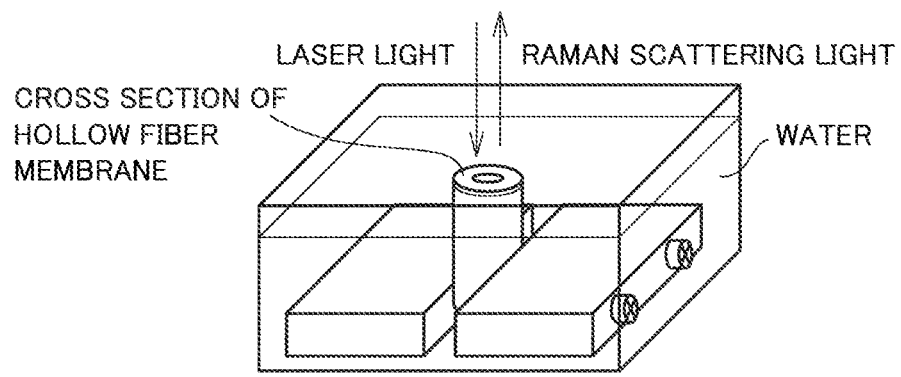
FIG. 3 is a schematic diagram for describing a method for measuring a Raman value.

Raman spectroscopy (micro-Raman spectrometer) is a method (apparatus) for detecting Raman scattered light generated by irradiating a measurement sample with laser light focused in spots, and obtaining a Raman spectrum by spectral analysis (see FIG. 3). The Raman spectrum is unique to a sample, and the intensity of the maximum peak in the Raman spectrum (peak unique to the main constituent material of the sample) for a certain sample is correlated with the density of the constituent material of the sample. Therefore, by measuring such a peak intensity, it is possible to analyze the distribution state of the density of the constituent material in the sample.

In order to accurately measure the density distribution state of the constituent material of the sample, an objective lens having a spatial resolution of 2 μm or less is used as an objective lens of the laser Raman microscope. The intensity of the laser light source of the laser Raman microscope at the time of measurement is weak enough not to cause deterioration of the sample during measurement, and it can be arbitrarily set within the range where a Raman spectrum can be obtained in several seconds to several tens of minutes of exposure time.

Specifically, first, a hollow fiber membrane is embedded in ice, and a cross section is prepared with a microtome. The prepared cross-sectional sample is immersed in water (swollen in water) and the cross section is slightly protruded from the water surface (see FIG. 3). For the cross section, a Raman spectrum (peak intensity of the maximum peak in the Raman spectrum) is measured by mapping (a method of measuring the Raman spectrum in a set range by scanning the laser light collected in spots) or imaging measurement (a method of measuring the Raman spectrum in a set range by scanning a laser light collected in a line) using a micro-Raman spectrometer (a laser Raman microscope) (reference: The Spectroscopical Society of Japan (2009, 1st edition) "Microspectroscopy to See Nano/Micro World" (Spectroscopic Measurement Introductory Series Volume 10) Kodansha Scientific, Ltd.). The measurement is performed at multiple positions in the membrane thickness direction in the cross section of the hollow fiber membrane.

Figure 5:
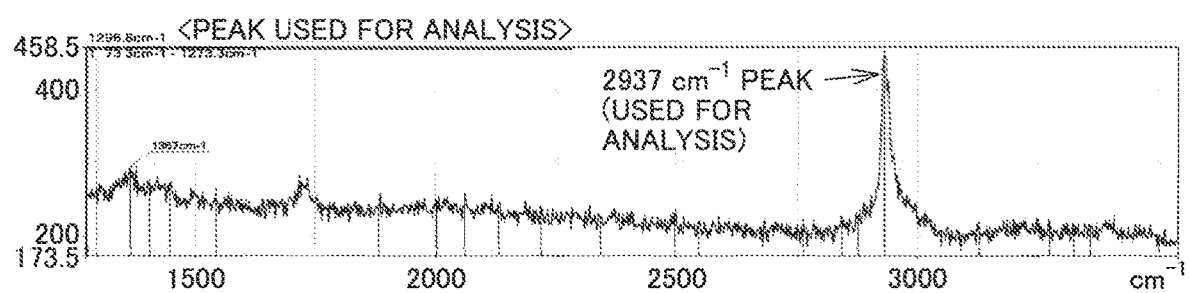
FIG. 5 is a schematic diagram for describing a method for measuring a Raman value.

The maximum peak in each of Raman spectra measured for the calculation of the Raman value is, for example, the highest intensity peak such as a peak corresponding to the stretching vibration of CH (carbon-hydrogen bond) near the wavelength of 2935 $cm^{-1}$ (see FIG. 5). The peak intensity can be calculated from the peak area or peak height of the selected peak.

Figure 4:
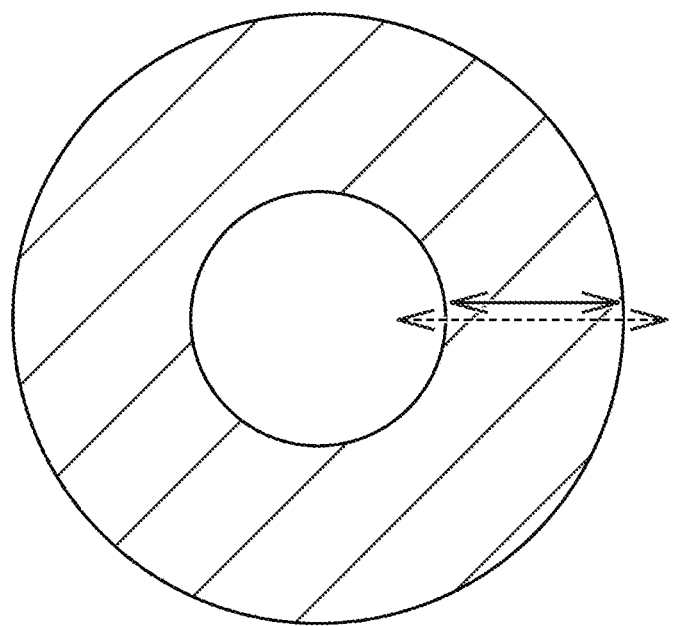
FIG. 4 is a schematic diagram for describing a method for measuring a Raman value.

In an actual measurement, first, a peak intensity of the maximum peak (peak near the wavelength of 2935 $cm^{-1}$) in each of the multiple Raman spectra is measured from the inside to the outside (left side to right side of FIG. 4), or from the outside to the inside (right side to left side of FIG. 4) at intervals of 1 μm over a predetermined range (a part of a broken-line arrow in FIG. 4) of the membrane thickness direction including the membrane part (a part indicated by a solid line in FIG. 4) of the hollow fiber membrane while observing the cross section of the hollow fiber membrane with a microscope. Then, only data on the membrane part of the hollow fiber (the part of the solid arrow in FIG. 4) is extracted from the data of multiple measured peak intensities.

Figure 6:
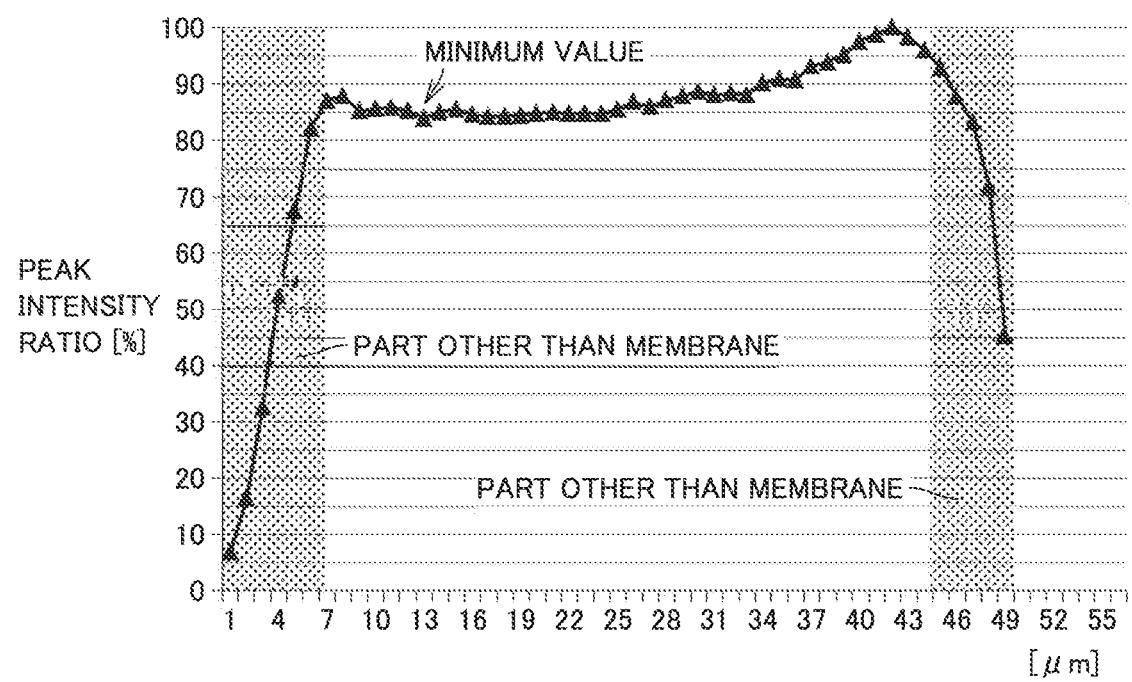
FIG. 6 is a graph showing an example of analysis results by Raman spectroscopy.

For example, first, the maximum value of all measured peak intensities is set to 100, and the ratio of other peak intensities (peak intensity ratio) is calculated. FIG. 6 shows an example of a graph of the peak intensity ratio. In FIG. 6, the X-axis indicates the position in the membrane thickness direction (direction of the arrow in FIG. 4) in the membrane cross-section, and the Y-axis indicates the peak intensity ratio. The peak intensity ratio shown in FIG. 6 is an intensity ratio of the peak (see FIG. 5) near 2935 $cm^{-1}$ derived from the polymer (CTA) that constitutes the hollow fiber membrane, and the peak intensity ratio correlates with the polymer density.

Here, in FIG. 6, a part within 5% (absolute value) of the rate of change in the value (peak intensity ratio) between neighboring points measured at 1 μm intervals containing the maximum value of the peak intensity ratio (100%) is the membrane part (the part indicated by the solid arrow in FIG. 4), and a part outside a point exceeding 5% (the part hatched in FIG. 6) is judged as the part other than the membrane. The data of the parts other than the membrane are deleted.

The minimum value of the peak intensity (peak intensity ratio) of the membrane part thus obtained is determined, and the ratio of the minimum value to the maximum value of the peak intensity (peak intensity ratio of the minimum value: see FIG. 6) is obtained as a Raman value.

(Permeate Flow Retention Rate)

Examples of an index for suppressing the decrease in the permeate flow rate of the hollow fiber membrane over time include a permeate flow retention rate. The higher the permeate flow retention rate is, the more the decrease in the permeate flow rate of the hollow fiber membrane over time is suppressed. When the hollow fiber membrane is continuously used for a predetermined membrane separation method (for example, reverse osmosis method), it is the ratio of the permeate flow rate after a predetermined time elapses from the start of use to the permeate flow rate at the start of use.

Examples of the permeate flow retention rate that is such an index include a permeate flow retention rate (100-hour permeate flow retention rate) after 100 hours elapses from the start of use. Since it is empirically known that performance changes in the membrane structure of the hollow fiber membrane stabilize after 100 hours of operation, it is considered that the effect of suppressing the decrease in the permeate flow rate of the hollow fiber membrane over time can be appropriately evaluated by using the permeate flow retention rate after 100 hours of operation as an index.

The 100-hour permeate flow retention rate of the hollow fiber membrane of the present embodiment is preferably 0.75 or more, more preferably 0.78 or more, and still more preferably 0.80 or more. In this case, it is considered that the decrease in the permeate flow rate of the hollow fiber membrane over time is suppressed more than in the conventional one.

(Cross-Sectional Inner Shape)

A cross-sectional inner shape of the hollow fiber membrane is preferably a triangular shape. In this case, there is an advantage that the deformation of the hollow fiber membrane in long-term use is suppressed, and the strength of hollow fiber member is increased. The triangular shape means a shape close to a triangle, and is a concept that includes a shape having lines that are not straight or no corners, such as Reuleaux triangle (see PTL 5: WO 2017/122673).

(Material)

A material constituting the hollow fiber membrane is not particularly limited and is preferably a material containing at least any of a cellulose-based polymer, a polysulfone-based polymer, and a polyamide-based polymer, and more particularly a material containing at least either of a cellulose-based polymer and a polysulfone-based polymer.

The cellulose-based polymer is preferably a cellulose acetate-based polymer. The cellulose acetate-based polymer is resistant to chlorine as a bactericide, and has such a feature that can suppress the growth of microorganisms. The cellulose acetate-based polymer is preferably cellulose acetate, and more preferably cellulose triacetate from the viewpoint of durability.

The polysulfone-based polymer is preferably a polyether sulfone-based polymer. The polyether sulfone-based polymer is preferably a sulfonated polyether sulfone.

Examples of the hollow fiber membrane include a membrane having a single layer structure. Here, it is preferable that structural symmetricity in the membrane thickness direction of the hollow fiber membrane is high. Examples of an index of structural symmetricity in the membrane thickness direction of the hollow fiber membrane include the Raman value of the above-mentioned hollow fiber membrane in a range of a predetermined value or more, and little change in the structure when a transverse cross-section of the hollow fiber membrane is continuously observed toward the membrane thickness direction using a scanning electron microscope (SEM) with a magnification of 5000 times.

When the hollow fiber membrane of the present embodiment is used, particularly, in a membrane separation process in which the hollow fiber membrane is exposed to higher pressure than in a forward osmosis (FO) method, such as a reverse osmosis (RO) method and a brine concentration (BC) method, it is possible to suppress the decrease in the permeate flow rate of the hollow fiber membrane over time. As a result, an increase in operational energy required for the membrane separation process using the hollow fiber membrane over time is suppressed.

The BC method is, for example, a membrane separation method as described in Japanese Patent Laying-Open No. 2018-65114, in which a part of a target solution is flowed into the first chamber of the hollow fiber membrane module, another part of the target solution is flowed into the other second chamber, and the target solution in the first chamber is pressurized, whereby a solvent (such as water) contained in the target solution in the first chamber is transferred to the second chamber via the hollow fiber membrane, the target solution in the first chamber is concentrated, and the target solution in the second chamber is diluted.

In addition, since a process using the RO method or the BC method is often used as a part of a system combined with other processes, the decrease in the permeate flow rate of the hollow fiber membrane over time may make it difficult to control the entire system. Therefore, the hollow fiber membrane of the present embodiment having a high permeate flow retention rate is used in a system in which the RO method and the BC method are combined with other processes, whereby the control of the entire system can be easily performed.

The hollow fiber membrane of the present embodiment can suppress a decrease in the permeate flow rate of the hollow fiber membrane over time, particularly when pressure is applied from the outside of the hollow fiber membrane (that is, when the pressure of a liquid on the outside of the hollow fiber membrane is higher than that on the inside of the hollow fiber membrane).

<Method for Producing Hollow Fiber Membrane>

The present invention also relates to a method for producing a hollow fiber membrane to obtain the above-described hollow fiber membrane.

With reference to FIG. 1, the method for producing a hollow fiber membrane of the present embodiment includes at least a spinning process and a post-treatment process.

[Spinning Process]

In the spinning process, a membrane-forming solution 80 is extruded from a nozzle 81 into a coagulation liquid 91 via an air gap, and a coagulation product of the membrane-forming solution is pulled out from the coagulation liquid, thereby obtaining a hollow fiber membrane that is a hollow fiber type semipermeable membrane. The hollow fibber membrane is pulled out, for example, by rollers 82, 83, 84, and 85. The pulling-out speed is a surface speed of roller 83.

The membrane-forming solution contains a raw material of the hollow fiber membrane (the above-mentioned materials constituting the hollow fiber membrane), and a solvent and a non-solvent. The mass ratio of the solvent/non-solvent in the membrane-forming solution is preferably 40/60 to 70/30. The solvent is a liquid capable of dissolving the raw material, and the non-solvent is a liquid in which the raw material is not dissolved. If the mass ratio of the solvent/non-solvent in the membrane-forming solution is too small (the ratio of NS is excessively increased), the structural symmetricity of the cross section of the membrane is improved, but the spinning stability may be lowered. Therefore, the ratio is more preferably 50/50 to 70/30.

The coagulation liquid contains a solvent and a non-solvent other than water. The total content of the "solvent" and the "non-solvent other than water" in the coagulation liquid (hereinafter, sometimes referred to as "concentration of the coagulation liquid") is preferably 30 to 70% by mass. When the concentration of the coagulation liquid is within this range, the initial permeate flow rate is large, and an effect of suppressing the permeate flow rate over time can be obtained (the permeate flow retention rate becomes large). When the concentration of the coagulation liquid is higher than this range, the initial permeate flow rate is large, but it is difficult to obtain the effect of suppressing the permeate flow rate over time (the permeate flow retention rate becomes small). On the other hand, when the concentration of the coagulation liquid is less than this range, the initial permeate flow rate is small and it is difficult to obtain the effect of suppressing the permeate flow rate over time. Therefore, the concentration of the coagulation liquid is more preferably 30 to 65% by mass.

The coagulation liquid contains a solvent and a non-solvent. The mass ratio of the "solvent (S)"/"non-solvent (NS) other than water" in the coagulation liquid is preferably 40/60 to 70/30

The temperature of the coagulation liquid is preferably 10 to 20° C. By setting the temperature of the coagulation liquid to 10° C. or more, the structural symmetricity (Raman value) in the membrane thickness direction of the hollow fiber membrane can be improved. However, when the temperature of the coagulation liquid exceeds 20° C., the Raman value tends to be low (the decrease in the polymer density from the outer surface side to the inner surface side becomes large).

[Post-Treatment Process]

In the post-treatment process, a hollow fiber membrane 86 obtained in the spinning process is washed with water and then subjected to a hot water treatment and a salt water treatment.

(Hot Water Treatment)

In the hot water treatment, the hollow fiber membrane 86 is immersed in a hot water 92. The temperature of the hot water 92 in the hot water treatment (temperature of the hot water treatment) is preferably 86° C. or more and less than 100° C., more preferably 90 to 99.5° C., and still more preferably 95 to 99° C. In this way, since the densification of the hollow fiber membrane is facilitated by performing the hot water treatment at a temperature higher than that of the conventional one, the decrease in the permeate flow rate of the hollow fiber membrane over time can be suppressed. The hot water treatment is preferably performed on hollow fiber membrane 86 in a tensionless state.

The time of the hot water treatment is preferably 5 to 120 minutes, and more preferably 10 to 40 minutes.

(Salt Water Treatment)

In the salt water treatment, the hollow fiber membrane 86 after the hot water treatment is immersed in a saline solution 93. The saline solution 93 is an aqueous solution containing chloride ions. Examples of the saline solution 93 include aqueous solutions of sodium chloride (table salt), potassium chloride, magnesium chloride, calcium chloride, lithium chloride, and the like. The concentration of the saline solution 93 is preferably 0.5 to 20% by mass, and more preferably 1.0 to 10% by mass. The temperature of the saline solution 93 (temperature of the salt water treatment) is preferably 70° C. or more and 95° C. or less.

The time of the salt water treatment is preferably 1 to 60 minutes, and more preferably 5 to 30 minutes. The salt water treatment is preferably performed on the hollow fiber membrane 86 in a tensionless state.

It is considered that the effect of suppressing the decrease in the permeate flow rate over time can be exerted by improving the structural symmetricity in the membrane thickness direction of the hollow fiber membrane. Examples of the main specific means thereof include to adjust an S/NS ratio (solvent/non-solvent ratio) of the membrane-forming solution and the composition (ratio of solvent/non-solvent other than water, concentration) of the coagulation liquid, and to carry out the salt water (salt annealing) treatment. It is considered that the nucleus growth of the precipitated polymer becomes uniform by decreasing the S/NS ratio of the membrane-forming solution (increasing the ratio of NS) as compared with the conventional one, and thereby the polymer density of the membrane becomes symmetric in the membrane thickness direction. Further, it is considered that the nucleus growth of the precipitated polymer becomes uniform by decreasing the mass ratio of the "solvent (S)"/"non-solvent (NS) other than water" of the coagulation liquid as compared with the conventional one (increasing the ratio of NS), and thereby the polymer density of the membrane becomes symmetric in the membrane thickness direction. It is also considered that the salt water treatment following the hot water treatment dehydrates the membrane to shrink the pores, thereby making the polymer density symmetric and increasing the strength.

EXAMPLES

The present invention will be described in more detail below with reference to Examples, but the present invention is not limited thereto.

Example 1

The hollow fiber membrane of Example 1 was produced under the following conditions by the method for producing a hollow fiber membrane described in the embodiment.

[Composition of Membrane-Forming Solution]
Polymer: cellulose triacetate (CTA) (LT35, manufactured by Daicel Corporation)
Polymer content: as shown in Table 1
Solvent: N-methylpyrrolidone (NMP)
Non-solvent: ethylene glycol (EG)
(solvent/non-solvent (S/NS) ratio: as shown in Table 1)
Benzoic acid [0.3% by mass]
[Conditions of Spinning Process]
Dissolution temperature of membrane-forming solution: 185° C. in Examples 1 to 13; 180° C. in Comparative Examples 1 to 3
Discharging temperature of membrane-forming solution: 151° C. in Examples 1 to 13; 163° C. in Comparative Examples 1 to 3

Nozzle for discharging: three-divided nozzle (cross-sectional area of nozzle: 0.05 mm²)
[The Cross-Sectional Area of the Nozzle is a Cross-Sectional Area of a Membrane-Forming Solution Discharging Hole at the Tip of the Nozzle.]
Air gap (AG) residence time: 0.05 seconds in Example 1 to 15; 0.03 seconds in Comparative Examples 1 to 3
Composition of coagulation liquid
  Solvent (S): NMP
  Non-solvent (NS) other than water: EG
  Water
  Concentration of coagulation liquid [(S+NS other than water)/mass ratio of coagulation liquid]: as shown in Table 1
  Mass ratio of solvent/non-solvent other than water (S/NS other than water) in the coagulation liquid: the same as S/NS of the membrane-forming solution shown in Table 1.
Temperature of coagulation liquid: as shown in Table 1.
Pulling-out speed: as shown in Table 1
[Conditions of Post-Treatment Process]
Conditions of hot water treatment
  Temperature: as shown in Table 1.
  Time: as shown in Table 1.
Conditions of salt water (salt annealing) treatment
  Concentration of saline solution: as shown in Table 1
  Temperature of saline solution: as shown in Table 1
  Time: as shown in Table 1

Examples 2 to 15

As shown in Table 1, the S/NS ratio of the membrane-forming solution (and the coagulation liquid), and the concentration and temperature of the coagulation liquid were changed. Except for those, the hollow fiber membranes of Examples 2 to 15 were produced in the same manner as in Example 1.

Comparative Examples 1 to 3

As shown in Table 1, the S/NS ratio of the membrane-forming solution (and the coagulation liquid), the temperature of the coagulation liquid, and the temperature of the hot water treatment were changed, and the salt water treatment was not performed. Except for those, the hollow fiber membranes of Comparative Examples 1 to 3 were produced in the same manner as in Example 1.
<Measurement of Raman Value>
The Raman values of the hollow fiber membranes of Examples 1 to 15 and Comparative Examples 1 to 3 were measured. The Raman values were measured by the measurement method described in the embodiment under the following conditions. The measurement results of the Raman values are shown in Table 1.
(Measurement Conditions of Raman Value)
One hollow fiber membrane was embedded in ice, and a cross section was prepared with a microtome. The prepared cross-sectional sample was immersed in water (swollen in water) and the cross section was slightly protruded from the water surface, and subjected to mapping analysis (measurement of Raman spectrum) under the conditions of a laser wavelength of 532 nm, a laser intensity of about 2.2 mW, an aperture diameter of 100 µm, an exposure time of 8 seconds, an exposure frequency of 1 time, a diffraction grating of 600 gr/mm, an objective lens of 50 times/NA of 0.55, and a scanning interval of 1.0 µm, using a micro-Raman spectrometer (laser Raman microscope: RAMAN-11, manufactured by Nanophoton Corporation). The Raman value can be measured at an arbitrary part (thin part or thick part of the membrane) of the membrane cross-section, but the thickest part (center part of the side of the rice ball) was measured.

The intensity of a peak near 2935 cm$^{-1}$ in the Raman spectrum was calculated using a peak area calculation software attached to the micro-Raman spectrometer. The peak width was fixed to 22.2 cm$^{-1}$ at 2800 to 3100 cm$^{-1}$ as a baseline and at the peak apex as the center. Then, fitting was performed using a Lorentz function, and the calculated peak area was taken as the signal intensity (peak intensity) (see FIG. 5).
<Measurement of Parameters Relating to Shape>
The outer diameters and inner diameters of the hollow fiber membranes of Examples 1 to 15 and Comparative Examples 1 to 3 (in the state after the salt water treatment, but in the state after the hot water treatment when the salt water treatment was not performed) were measured as follows. As a result, the hollow fiber membranes of Examples 1 to 15 had an outer diameter of 137 µm and an inner diameter of 55 µm. The hollow fiber membranes of Comparative Examples 1 to 3 had an outer diameter of 175 µm and an inner diameter of 100 µm.
(Measurement of Inner Diameter and Outer Diameter)
The inner diameter, outer diameter, and membrane thickness of the hollow fiber membrane can be obtained by measuring short and long diameters of the hollow fiber membrane cross-section using a projector (Nikon PROFILE PROJECTOR V-12) after passing the appropriate number of hollow fiber membranes through a hole having a diameter of 3 mm in the center of a slide glass so that the hollow fiber membranes do not fall out and by cutting the hollow fiber membrane along upper and lower surfaces of the slide glass with a razor to obtain a hollow fiber membrane cross-section sample. For the outer diameter, the diameters (short diameter and long diameter) in 2 directions were measured for 1 hollow fiber membrane cross-section, and the arithmetic average of these values was taken as the outer diameter of 1 hollow fiber membrane cross-section. For the inner diameter, the lengths of the long side and the short side of the rectangle circumscribing the rice ball were measured, and the arithmetic average value was taken as the inner diameter of 1 hollow fiber membrane cross-section. The measurement was performed in the same manner for 10 cross sections including the maximum and minimum, and the average values were taken as the inner diameter and the outer diameter.
<Performance Confirmation Test and Measurement of 100-Hour Permeate Flow Retention Rate>
First, a performance (RO performance) confirmation test was performed on a hollow fiber membrane module using the hollow fiber membranes of the Examples and the Comparative Examples. Specifically, the RO test (pressure outside the hollow fiber membrane: 5.45 MPa, NaCl concentration of the test solution at the inlet outside the hollow fiber membrane: 35000 mg/L, temperature of the test solution: 25° C.) was performed using the hollow fiber membrane module for 1 hour. Then, the permeate flow rate (initial permeate flow rate) and the salt rejection rate were measured, and it was confirmed that they did not deviate from performance standards of the hollow fiber membrane (HF). The measurement results of the initial permeate flow rate and the salt rejection rate are shown in Table 1. For example, considering a normal reverse osmosis membrane as the standard, the permeated flow rate is preferably 45 L/m²/day or more. The salt rejection rate is preferably 90% or more, more preferably 95% or more, and still more preferably 99% or more.

After the measurement of the initial permeate flow rate and the like, the RO test (pressure outside the hollow fiber membrane: 6.76 MPa, NaCl concentration of the test solution at the inlet outside the hollow fiber membrane: 47000 mg/L, temperature of the test solution: 35° C.) was performed using the hollow fiber membrane module for 100 hours. Then, a permeate flow rate after 2 hours elapsed and a permeate flow rate after 100 hours elapsed were measured. A ratio of the permeate flow rate after 100 hours elapsed to the permeate flow rate after 2 hours elapsed was determined as a 100-hour permeate flow retention rate. Results are shown in Table 1.

Figure 2:
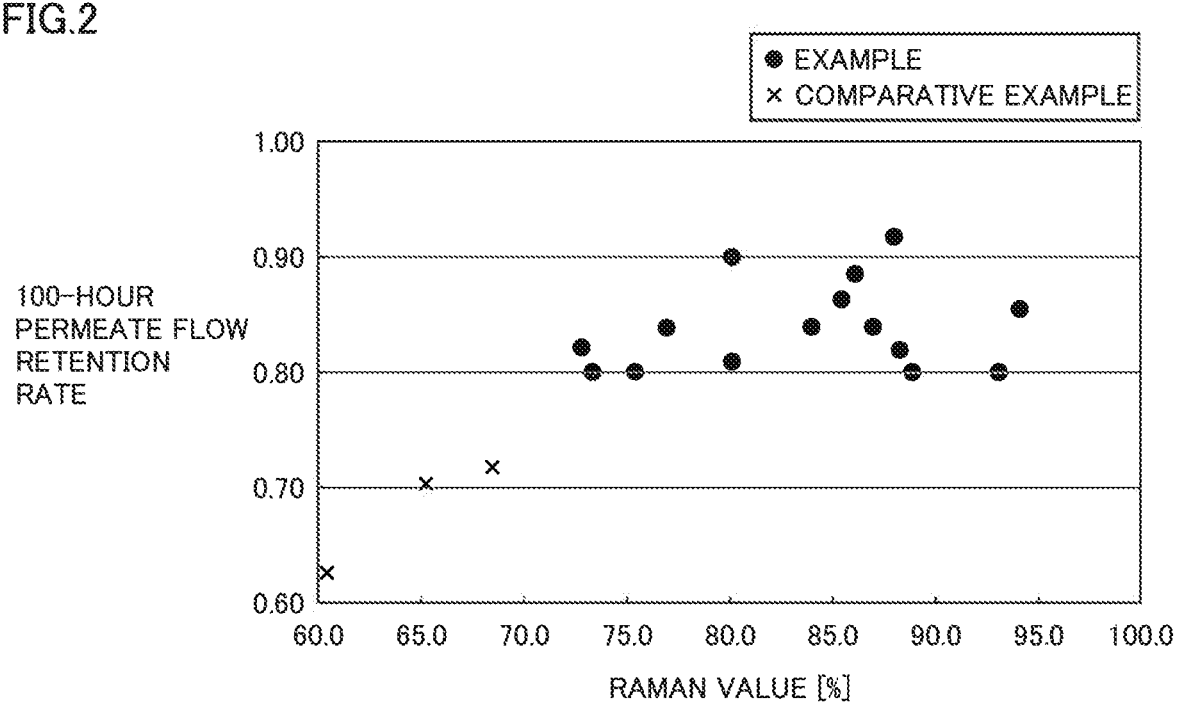
FIG. 2 is a graph showing a relationship between a Raman value and a permeate flow retention rate for the hollow fiber membrane of Examples and Comparative Examples.

In FIG. 2, the relationship between the Raman value and the permeate flow retention rate is shown in a graph for the hollow fiber membranes of the Examples and the Comparative Examples.

TABLE 1

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| S/NS ratio of membrane-forming solution (coagulation liquid) | | 55/45 | 60/40 | 60/40 | 60/40 | 60/40 | 60/40 | 60/40 | 50/50 | 70/30 | 60/40 |
| Polymer concentration [% by mass] | | 41.2 | 41.2 | 41.2 | 41.2 | 41.2 | 41.2 | 41.2 | 41.2 | 41.2 | 41.2 |
| Coagulation liquid | Concentration [% by mass] | 45 | 45 | 45 | 45 | 40 | 50 | 30 | 45 | 34 | 65 |
|  | Temperature [° C.] | 20 | 16 | 12 | 20 | 20 | 20 | 20 | 20 | 20 | 20 |
| Spinning speed [m/min] | | 40 | 40 | 40 | 40 | 40 | 40 | 40 | 40 | 40 | 40 |
| Hot water treatment | Temperature [° C.] | | | | | 98 | | | | | |
|  | Time [min] | | | | | 25 | | | | | |
| Salt water treatment | Concentration of saline solution [% by mass] | | | | | 4.5 | | | | | |
|  | Temperature [° C.] | | | | | 82 | | | | | |
|  | Time [min] | | | | | 10 | | | | | |
| Membrane dimension | Outer diameter [μm] | | | | | 137 | | | | | |
|  | Inner diameter [μm] | | | | | 55 | | | | | |
| Raman value [%] | | 86.0 | 83.9 | 86.9 | 75.3 | 76.8 | 88.8 | 72.7 | 87.9 | 80.0 | 93.0 |
| Membrane performance | Initial permeate flow rate [L/m²/D] | 72 | 62 | 58 | 65 | 58 | 65 | 56 | 45 | 58 | 65 |
|  | Salt rejection rate [%] | 99.9 | 99.9 | 99.9 | 99.9 | 99.9 | 99.9 | 99.9 | 99.9 | 99.9 | 99.9 |
|  | 100-Hour permeate flow retention rate | 0.886 | 0.839 | 0.839 | 0.800 | 0.839 | 0.800 | 0.822 | 0.918 | 0.810 | 0.800 |

|  |  | Example | | | | | Comparative Example | | |
|---|---|---|---|---|---|---|---|---|---|
|  |  | 11 | 12 | 13 | 14 | 15 | 1 | 2 | 3 |
| S/NS ratio of membrane-forming solution (coagulation liquid) | | 40/60 | 60/40 | 60/40 | 55/45 | 55/45 | 85/15 | 70/30 | 70/30 |
| Polymer concentration [% by mass] | | 41.2 | 41.2 | 41.2 | 41.2 | 39.2 | 41.2 | 41.2 | 41.2 |
| Coagulation liquid | Concentration [% by mass] | 50 | 45 | 45 | 38 | 31 | 45 | 45 | 45 |
|  | Temperature [° C.] | 20 | 20 | 20 | 14 | 10 | 5 | 5 | 5 |
| Spinning speed [m/min] | | 40 | 40 | 40 | 30 | 30 | | | |
| Hot water treatment | Temperature [° C.] | | 98 | | 98 | 98 | 60 | 75 | 85 |
|  | Time [min] | | 25 | | 20 | 20 | 25 | 25 | 25 |
| Salt water treatment | Concentration of saline solution [% by mass] | | 4.5 | | 3.5 | 3.5 | No salt water treatment | | |
|  | Temperature [° C.] | 82 | 70 | 95 | 88 | 88 | | | |
|  | Time [min] | | 10 | | 20 | 20 | | | |
| Membrane dimension | Outer diameter [μm] | | 137 | | 200 | 200 | | 175 | |
|  | Inner diameter [μm] | | 55 | | 90 | 90 | | 100 | |

TABLE 1-continued

| | | | | | | | | | |
|---|---|---|---|---|---|---|---|---|---|
| Raman value [%] | | 94.0 | 73.0 | 80.0 | 85.4 | 87.2 | 65.2 | 60.4 | 68.4 |
| Membrane performance | Initial permeate flow rate [L/m$^2$/D] | 65 | 74 | 53 | 51 | 58 | 5 | 2 | 6 |
| | Salt rejection rate [%] | 99.9 | 99.9 | 99.9 | 99.9 | 99.9 | 75.2 | 38.4 | 72.3 |
| | 100-Hour permeate flow retention rate | 0.855 | 0.800 | 0.900 | 0.865 | 0.817 | 0.703 | 0.625 | 0.717 |

From the results shown in Table 1 and FIG. 2, it is understood that in Examples 1 to 15 in which the Raman value of the hollow fiber membrane is 0.70 or more, the 100-hour permeate flow retention rate significantly rises as compared with that in Comparative Examples 1 to 3 in which the Raman value is less than 0.70. Therefore, it is considered that when the hollow fiber membranes of the Examples are used, the permeate flow retention rate after 100 hours elapses is higher and the decrease in the permeate flow rate of the hollow fiber membrane over time is suppressed as compared to the time when the hollow fiber membranes of the Comparative Examples are used.

The embodiments and Examples disclosed here should be considered illustrative in all points and not restrictive. The scope of the present invention is shown not by the above description but by the scope of the claims, and is intended to include meanings equivalent to the scope of the claims and all changes within the scope.

REFERENCE SIGNS LIST 80 membrane-forming solution, 81 nozzle, 82, 83, 84, 85 roller, 86 hollow fiber membrane, 91 coagulation liquid, 92 hot water, 93 saline solution.

The invention claimed is:

1. A hollow fiber membrane that is a hollow fiber semipermeable membrane, wherein
a Raman value is 70% or more, and
the Raman value is a ratio of a minimum value to a maximum value of peak intensities obtained by Raman spectroscopy measured at multiple points in a membrane thickness direction of a transverse cross-section of the hollow fiber membrane in a state after being immersed in water.

2. The hollow fiber membrane according to claim 1, wherein the Raman value is 70% or more and 95% or less.

3. The hollow fiber membrane according to claim 1, comprising a material that contains at least any of a polymer containing cellulose, a polymer containing polysulfone, and a polymer containing polyamide.

4. The hollow fiber membrane according to claim 1, wherein an inner diameter of the hollow fiber membrane is 40 μm or more and 200 μm or less.

5. The hollow fiber membrane according to claim 1, wherein a cross-sectional inner shape of the hollow fiber membrane is a triangular shape.

6. A method for producing a hollow fiber membrane, comprising:
spinning by extruding a membrane-forming solution from a nozzle into a coagulation liquid via an air gap and pulling out a coagulation product of the membrane-forming solution from the coagulation liquid to obtain a hollow fiber membrane that is a hollow fiber semipermeable membrane; and
post-treatment in which the hollow fiber membrane obtained in the spinning is washed with water, and then subjected to at least a hot water treatment and a salt water treatment,
wherein
the membrane-forming solution comprises a solvent and a non-solvent, and a mass ratio of solvent/non-solvent in the membrane-forming solution is 40/60 to 70/30,
the coagulation liquid comprises a solvent and a non-solvent other than water, and the total content of the solvent and the non-solvent other than water in the coagulation liquid is 30 to 70% by mass,
a temperature of the coagulation liquid is 10 to 20° C., and
a temperature of the salt water treatment is 70° C. or more and 95° C. or less.

7. A hollow fiber membrane that is produced by the production method according to claim 6.

* * * * *